W. F. HARRISON.
TUBE WELDING MACHINE.
APPLICATION FILED DEC. 1, 1910.

993,988.

Patented May 30, 1911.

3 SHEETS—SHEET 1.

W. F. HARRISON.
TUBE WELDING MACHINE.
APPLICATION FILED DEC. 1, 1910.

993,988.

Patented May 30, 1911.

3 SHEETS—SHEET 2.

Inventor—
William F. Harrison.
by his Attorneys,
Howson & Howson
Henry Howson

W. F. HARRISON.
TUBE WELDING MACHINE.
APPLICATION FILED DEC. 1, 1910.

993,988.

Patented May 30, 1911.

3 SHEETS—SHEET 3.

UNITED STATES PATENT OFFICE.

WILLIAM F. HARRISON, OF COATESVILLE, PENNSYLVANIA, ASSIGNOR TO JOHN S. WORTH AND WILLIAM P. WORTH, OF COATESVILLE, PENNSYLVANIA.

TUBE-WELDING MACHINE.

993,988.  Specification of Letters Patent.  Patented May 30, 1911.

Application filed December 1, 1910. Serial No. 595,010.

To all whom it may concern:

Be it known that I, WILLIAM F. HARRISON, a citizen of the United States, residing in Coatesville, Chester county, Pennsylvania, have invented certain Improvements in Tube-Welding Machines, of which the following is a specification.

This invention relates to certain improvements in machines for welding short sections on the ends of metal tubes. Tubes of this type are made so that the body of the tube will be of one grade of metal for a given purpose and the ends of the tube will be of another grade.

The object of my invention is to construct a machine which will properly form the weld between the body of the tube and the end sections and which will be easily operated; the machine being substantial in construction and readily adjustable to fit tubes of different sizes.

Figure 1:
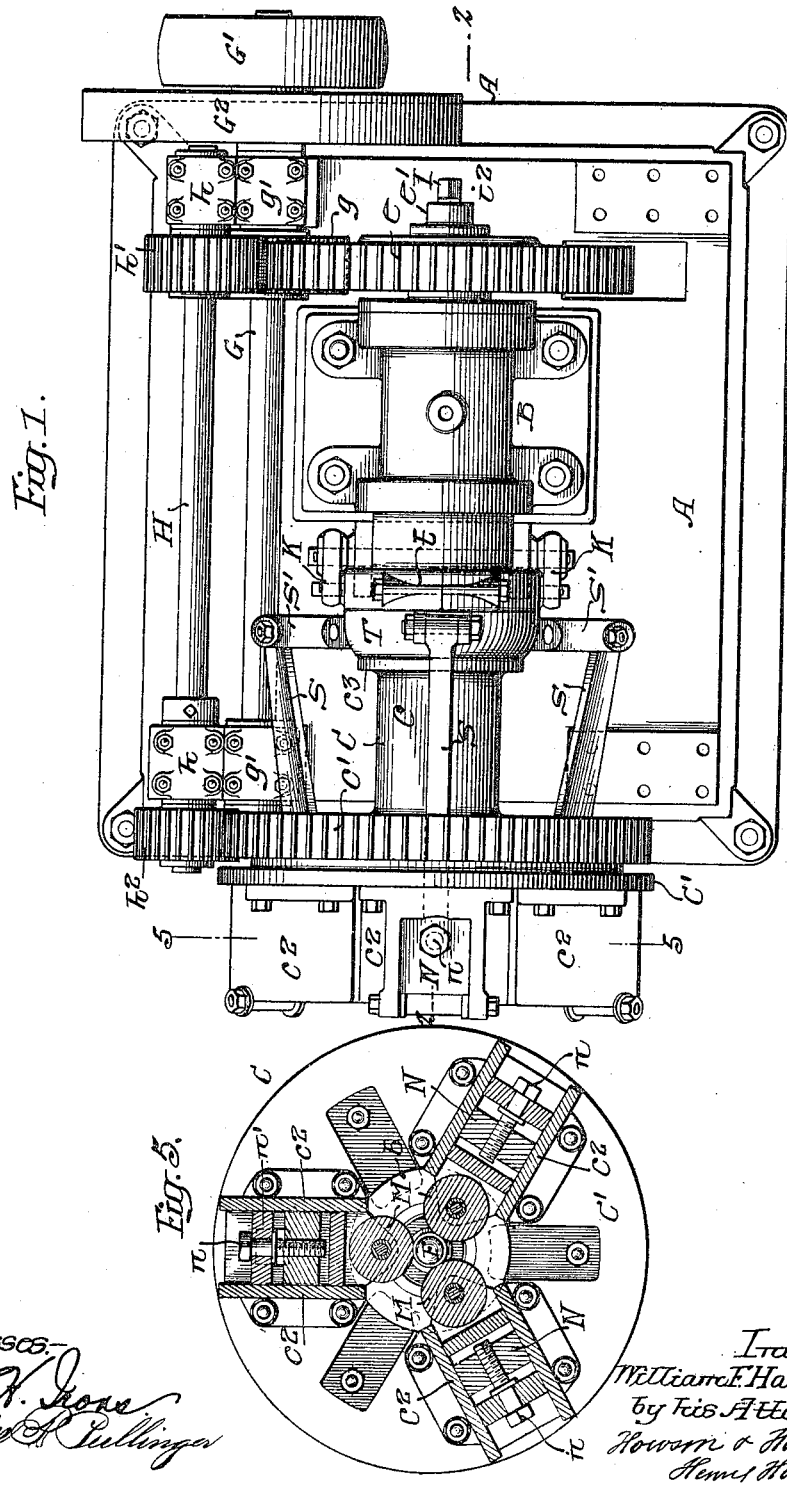
Figure 2:
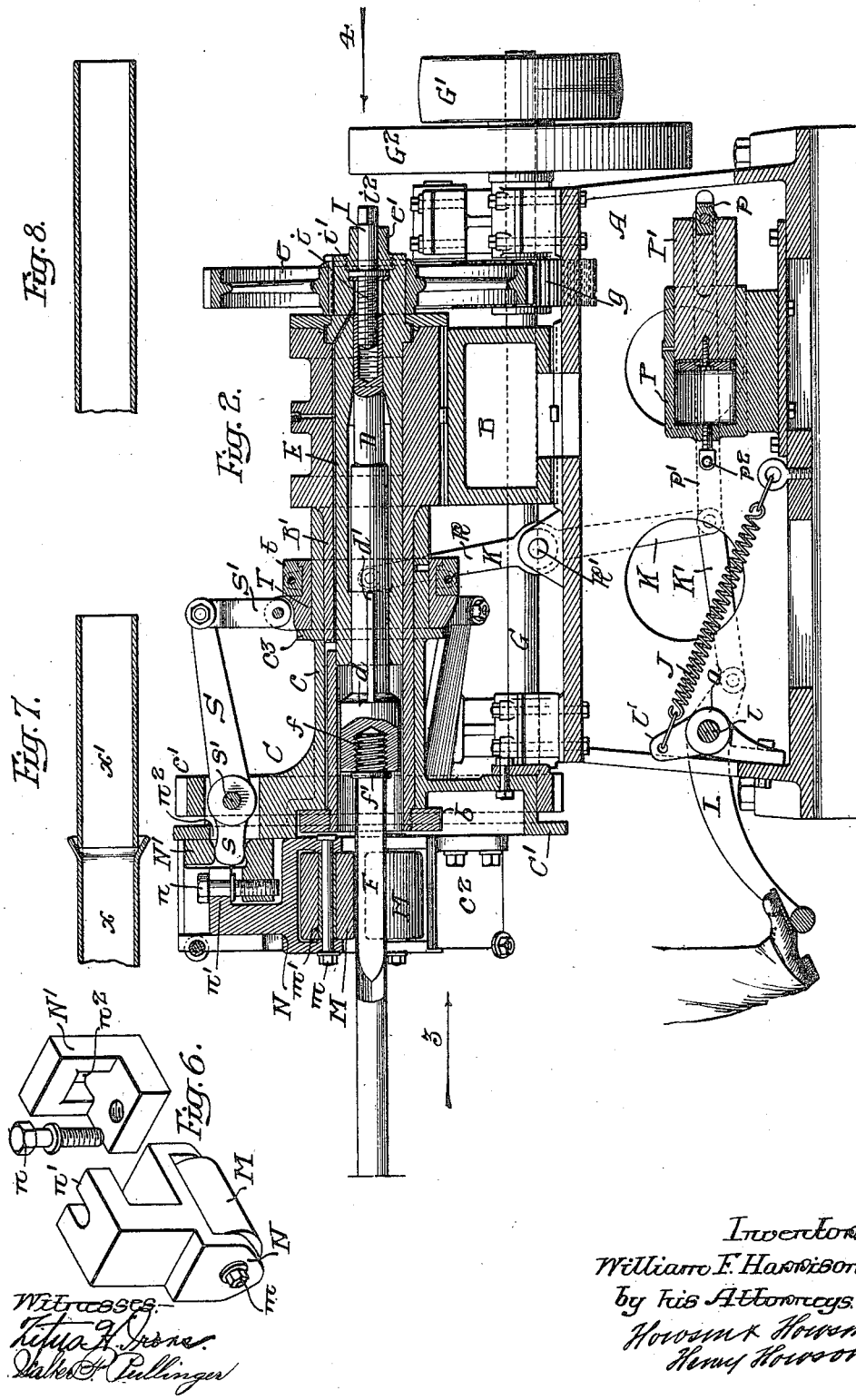
Figure 3:
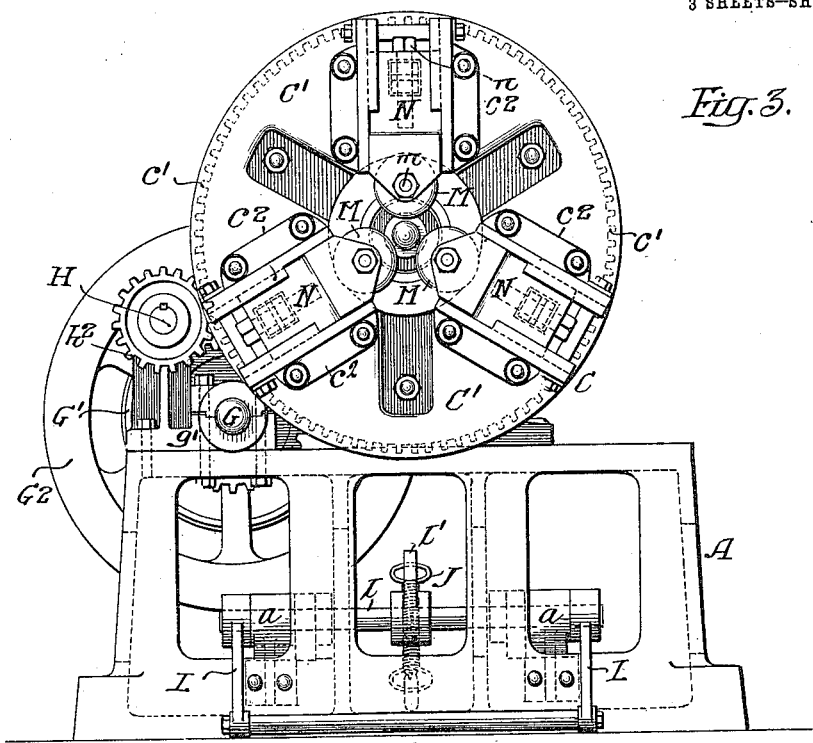
Figure 4:
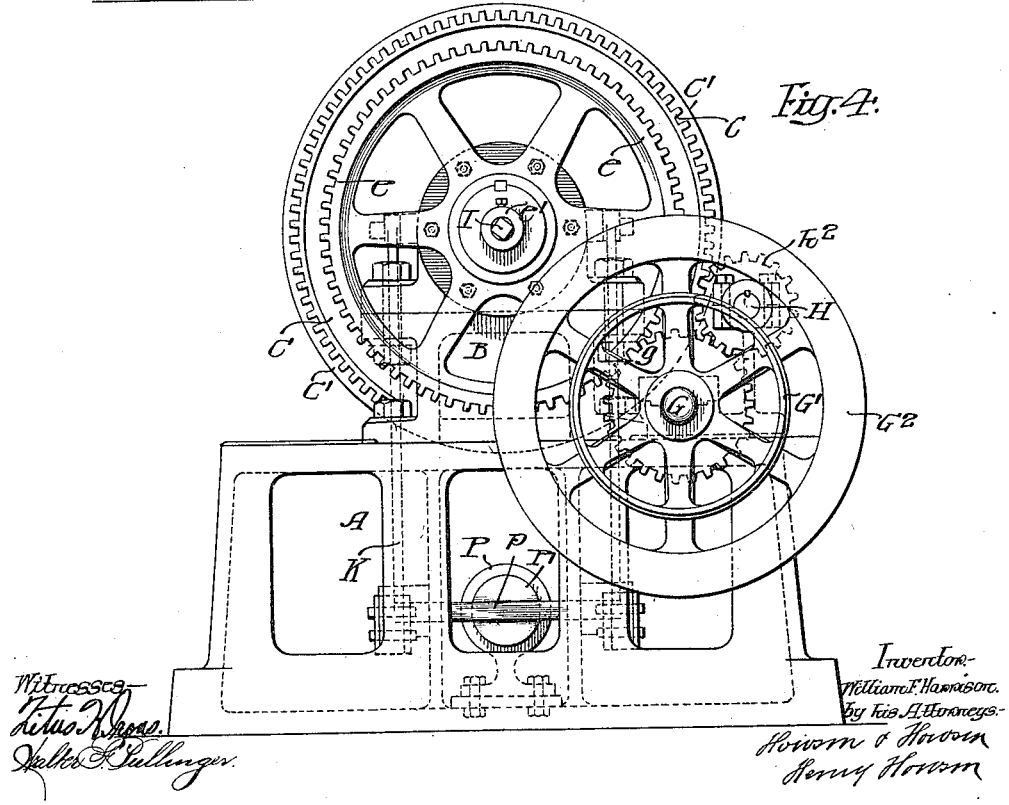

In the accompanying drawings:—Figure 1, is a plan view of my improved tube welding machine; Fig. 2, is a longitudinal sectional elevation on the line 2—2, Fig. 1; Fig. 3, is an end view looking in the direction of the arrow 3, Fig. 2; Fig. 4, is an end view looking in the direction of the arrow 4, Fig. 2; Fig. 5, is a transverse sectional view on the line 5—5, Fig. 1; Fig. 6, is a detached perspective view of one of the adjustable heads; Fig. 7, is a sectional view of the two sections of the tube before welding; and Fig. 8, is a sectional view of one end of the finished tube.

A is the base of the machine on which is mounted the frame B having the tubular horn B' extending toward the front edge of the machine. Mounted on this tubular horn is the carrier C; the hub $c$ of this carrier being confined between the main frame B and a nut $b$ adapted to the threaded end of the horn B'.

E is a hollow shaft mounted in the main frame B and within this shaft is the spindle D having a head $d$ provided with a screw threaded opening adapted to receive the threaded end $f$ of the mandrel F on which the tube is mounted during the welding process. This mandrel has a conical end, as shown, so that the end of the tube can be readily placed on the mandrel. The end of the mandrel preferably extends beyond the welding rollers as illustrated clearly in Fig. 2. Secured to the hollow shaft E is a gear wheel $e$ which meshes with a pinion $g$ on the main driving shaft G adapted to bearings $g'$ on the base A. On one end of this shaft is a pulley G' adapted to receive the driving belt. Located at one side of the driving shaft G is an intermediate shaft H mounted in bearings $h$, $h$ on the base A, and on this shaft H is a pinion $h'$ which meshes with the pinion $g$ on the shaft G and at the opposite end of the shaft H is a pinion $h^2$ which meshes with a gear wheel $c'$ mounted on or forming part of the carrier C. By this construction the mandrel F is rotated in one direction while the carrier having the welding rollers is rotated in the opposite direction and at a different speed.

On the shaft G is a fly wheel $G^2$, in the present instance located between the belt wheel G' and the base A. In order to longitudinally adjust the mandrel F, I provide the spindle D with a feather $d'$ which is adapted to a groove in the hollow shaft E so that, while the spindle must turn with the hollow shaft, it can be adjusted longitudinally independently of it. One form of adjustment is clearly illustrated in Fig. 2 and consists of a screw stem I having a threaded portion $i$ adapted to a threaded opening in the end of the spindle D and provided with a collar $i'$, which is held between the end of the shaft E and a screw block $e'$. The end $i^2$ of the screw stem is shaped to receive a wrench so that on turning the screw stem in one direction the mandrel F will be projected and on turning it in the opposite direction the mandrel will be retracted.

It will be understood that there are different sized mandrels to fit tubes of different diameters, and the mandrel F can be readily removed from the head $d$ and another one placed in position. It will be noted that the mandrel has a flange $f'$ at the inner end and this flange forms an abutment for the end of the tube to be welded (Fig. 2).

The carrier C has a face plate C' to which are secured the guides $c^2$ having the heads or slides N which carry the rollers M, three in the present instance. These rollers are mounted on spindles $m$ on the head N and preferably have bushings $m'$, as clearly illustrated in Fig. 2. The head is adapted to slide in ways in the guides $c^2$ and each head has an adjustable block N'. In the present instance, this block is adjustably connected to the slide N by a screw $n$ mounted in a slot in the projection $n'$ of the slide N; the threaded portion of the screw entering the block N'. In the block is an opening $n^2$ for the reception of the short arm $s$ of a lever S pivoted at $s'$ to the carrier C. There is a lever for each of the blocks. The long arm of each lever is connected by a link $S'$ to a sleeve T mounted on the carrier C. This sleeve is free to slide on the carrier and its forward movement is limited by a flange $c^3$ on the carrier and the rearward movement by the frame B.

On the sleeve T is a ring $t$; the sleeve being formed so that it will turn in the ring. The ring is connected to the fork $k$ of a lever K pivoted at $k'$ to the base A of the machine. The lever is connected by a link $K'$ to the short arm of the foot lever L pivoted at $l$ to a bracket $a$ secured to the base A. A spring J, attached to an arm $l'$ on the foot lever L and to a ring on the base A, tends to hold the foot lever in its normal upper position.

When compressed air is available, I prefer to mount on the base A a cylinder P having a plunger $P'$; the cylinder being extended so as to provide sufficient bearing for the plunger, and on one end of this plunger is a cross head $p$ connected to side bars $p'$ which are, in turn, connected to the lever K. Air is admitted and exhausted through a pipe $p^2$ at one end of the cylinder and may be controlled by any suitable valve within easy reach of the operator.

The operation of the machine is as follows:—The end section $x'$ of the tube to be welded is fitted to the body $x$, as indicated in Fig. 7, and heated. The tube is then inserted in the machine until the end of the section $x'$ rests against the flange $f'$ of the mandrel F; the machine being previously set in motion. The treadle is then depressed, as in Fig. 2, causing the rollers to move toward the tube and, as the tube is brought to a welding heat prior to its insertion in the machine, the two parts are welded together by the pressure of the rollers; the mandrel F turning in one direction, while the head carrying the rollers turns in the opposite direction. Not only is a perfect weld made, but the inside and the outside of the tube are finished by the rolling down of the parts.

It will be understood that the rollers are comparatively long, so that they will bear upon that portion of the tube not brought to a welding heat, so that when the rollers contact with this portion of the tube their movement toward the center of the machine is stopped. The end of the tube is free from all depressions or ridges and a perfect weld is made.

When tubes of different sizes are to be welded, all that is necessary is to remove one mandrel F and insert another of the proper size, and if end sections of different lengths are to be welded to the body portion of the tube, the spindle D carrying the mandrel can be moved longitudinally by turning the adjusting stem I. To accommodate tubes of different diameters, the adjusting screws $n$ of the heads N can be turned so as to move the heads toward and from the center of the machine. Thus the machine can be readily adjusted to accommodate tubes of different diameters and lengths.

The tube can be supported at its outer end by any suitable device and is usually supported by a post carrying a roller or a spindle.

I claim:—

1. The combination in a machine for welding the ends of tubes, of a mandrel, means for rotating the mandrel in one direction, a roller, a carrier for said roller, and means for rotating the carrier in the opposite direction to that of the mandrel.

2. The combination in a machine for welding the ends of tubes, of a main frame having a tubular horn, a hollow shaft mounted in the main frame, a spindle mounted in the hollow shaft and arranged to slide longitudinally in the shaft but to turn with it, a mandrel carried by the spindle, a carrier mounted on the horn and having slides, and a welding roll carried by each slide.

3. The combination in a machine for welding the ends of tubes, of a main frame having a tubular horn, a hollow shaft mounted in the main frame, a spindle mounted in the hollow shaft and arranged to slide longitudinally in the shaft and to turn with it, a mandrel carried by the spindle, a carrier mounted on the horn and having a series of slides, a welding roll carried by each slide, with gearing whereby the mandrel is turned in one direction and the carrier is turned in the opposite direction.

4. The combination in a machine for welding the ends of tubes, of a main frame having a tubular horn, a hollow shaft mounted in the main frame, a spindle mounted in the hollow shaft and arranged to slide longitudinally in the shaft and to turn with it, a mandrel carried by the spindle, a carrier mounted on the horn and having a series of slides, a welding roll carried by each slide, with a driving shaft, and gears connecting the driving shaft with the hollow shaft and gears connecting the driving shaft with the carrier, said gears being so proportioned and arranged that they will drive the mandrel in one direction at one speed and drive the carrier in the opposite direction at another speed.

5. The combination of a base, a main frame on the base, a hollow horn projecting from the main frame, a hollow shaft mounted in the main frame, a spindle within the hollow shaft and splined thereto so that it must turn with the shaft but can be adjusted longitudinally therein, a detachable mandrel at one end of the spindle, means at the other end of the spindle for longitudinally adjusting the spindle, with welding rolls and a carrier on which the welding rolls are mounted.

6. The combination in a machine for welding the ends of tubes, of a base, a main frame having a projecting horn, a mandrel mounted in the horn, means for turning the mandrel, a carrier mounted on the horn, means for rotating the carrier, said carrier having a series of radial guides, heads mounted in the guides, welding rollers carried by each head, and means for moving the heads toward and from the center of the mandrel.

7. The combination in a machine for welding the ends of tubes, of a base, a main frame having a projecting horn, a mandrel mounted within the horn, means for rotating the mandrel, a carrier mounted on the horn and having a face plate, a series of radial guides on the face plate, heads mounted in the guides, a welding roller on each head, an adjustable block connected to each head, a series of levers pivotally mounted on the carrier and arranged to engage the adjustable blocks of the heads, a sleeve on the carrier connected to the levers, and mechanism for shifting the sleeve on the carrier to move the welding rollers toward and from the mandrel.

8. The combination in a machine for welding the ends of tubes, of a base, a frame mounted on the base, a carrier mounted so as to freely turn on the frame, sliding heads on the carrier, a welding roller mounted on each head, means for moving the heads toward and from the center of the machine, a hollow shaft mounted in the frame, a spindle in the hollow shaft, a mandrel detachably secured to the end of the spindle, a feather on the spindle adapted to a longitudinal groove in the hollow shaft, an adjusting screw at the end of the hollow shaft engaging the spindle, a gear wheel on the hollow shaft, a driving shaft, a pinion on the driving shaft, with which the gear wheel meshes so as to turn the mandrel in one direction, a gear wheel on the carrier, and an intermediate pinion meshing with the gear wheel and driven from the driving shaft so as to turn the carrier in the direction opposite to that of the mandrel.

In testimony whereof, I have signed my name to this specification, in the presence of two subscribing witnesses.

WILLIAM F. HARRISON.

Witnesses:
Wm. E. Shupe,
Wm. A. Barr.

---

Copies of this patent may be obtained for five cents each, by addressing the "Commissioner of Patents, Washington, D. C."